Feb. 5, 1924. 1,483,000
H. KRUESHELD
ELECTRIC COOKING UTENSIL
Filed April 9, 1923
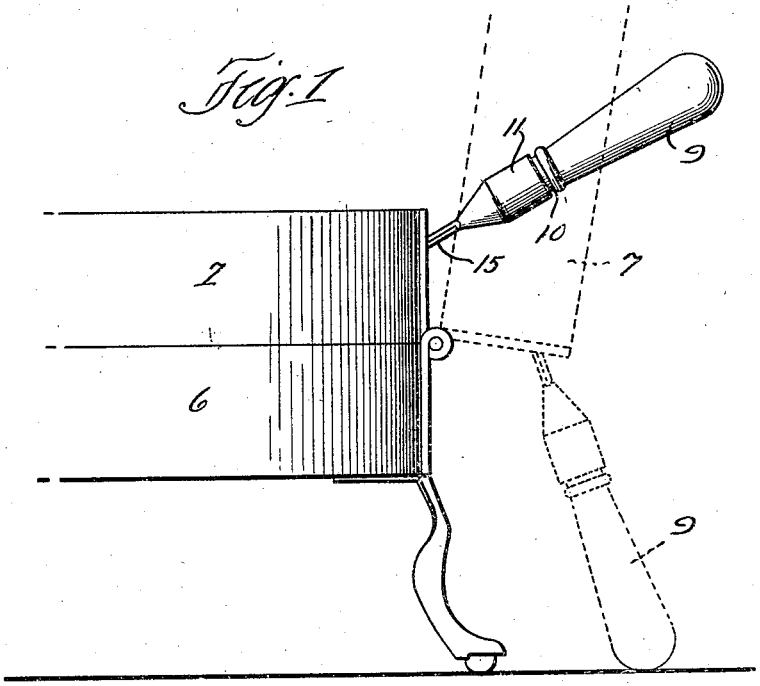
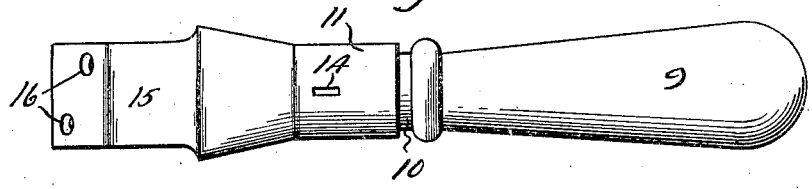
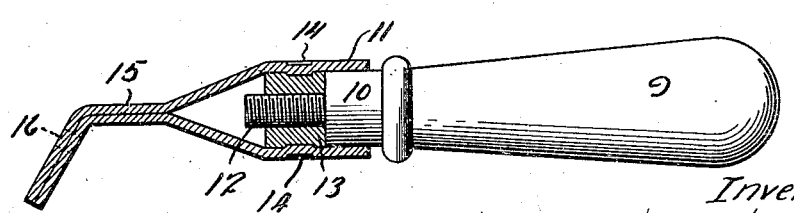
Inventor
Henry Kruesheld
By John A. Bommhardt
Atty.

Patented Feb. 5, 1924.

1,483,000

UNITED STATES PATENT OFFICE.

HENRY KRUESHELD, OF NEW WASHINGTON, OHIO, ASSIGNOR TO THE PERFECTION ELECTRIC PRODUCTS CO., OF NEW WASHINGTON, OHIO, A CORPORATION OF OHIO.

ELECTRIC COOKING UTENSIL.

Original application filed April 18, 1922, Serial No. 554,703. Divided and this application filed April 9, 1923. Serial No. 630,982.

*To all whom it may concern:*

Be it known that I, HENRY KRUESHELD, a citizen of the United States, residing at New Washington, in the county of Crawford and State of Ohio, have invented certain new and useful Improvements in Electric Cooking Utensils, of which the following is a specification.

This application is a division of my pending application #554,703 filed April 18, 1922.

This invention relates to electric cooking utensils, and particularly to devices of that type in which there is a base portion and a cover portion hinged together such as the utensil shown in my Patent #1,405,043. In this patent the handle by which the cover is lifted is located diametrically opposite the hinge, and the hand of the operator is liable to be burned by steam from the waffle or other article being cooked when the cover is opened.

The present invention includes or embodies a modification or improvement of the utensil referred to, the change consisting in placing the handle at the same side of the cover or upper part as the hinge, so that the hand of the operator is always protected, and the handle also serves the purpose of supporting the cover in open position when desired. The improvement also includes novel means for attaching the handle to the cover part.

The invention is illustrated in the accompanying drawings in which Fig. 1 is a partial side elevation of the utensil. Fig. 2 is a plan of the handle. Fig. 3 is a section showing the handle connection.

As shown in Fig. 1, the utensil has a base part 6 and a top or cover part 7 hinged together at one side at 8 so that the top may be swung up to open position, as shown in dotted lines in Fig. 1. The handle is fastened to the top part just above the hinge, and when the cover is swung open the handle rests on the table and supports the cover in open position, as shown in dotted lines in Fig. 1. The internal construction of the parts 6 and 7 may be as desired, for example such as shown in my patent above referred to, the details thereof are immaterial to the present invention.

The wooden handle is indicated at 9 and at its inner end is reduced as indicated at 10 to fit in a socket 11, and is provided with a screw 12 which screws into a block 13 which is set in the socket and held by depressed nibs 14 pressed in the tubular wall of the socket. This tubular wall is flattened or pressed together to make an angular shank 15 of double thickness, the end flange of which has holes 16 by which it may be riveted to the side of the cover or top section 7. The handle is thus supported at such an angle that it may be pressed down to swing the cover up on its hinge and to support the cover in open position as above referred to.

I claim:

A handle connection for cooking utensils comprising a socket member the walls of which are flattened together for attachment to the utensil, a block having a threaded bore fitting in the socket, the walls of the socket having depressed nibs engaging the block to hold it in place, and a handle fitting in the end of the socket and having a screw at its inner end engaging the bore of the block.

In testimony whereof, I affix my signature.

HENRY KRUESHELD.